(12) United States Patent
Taga et al.

(10) Patent No.: US 6,374,596 B2
(45) Date of Patent: Apr. 23, 2002

(54) EXHAUST-GAS CLEANING DEVICES FOR ENGINE

(75) Inventors: Junichi Taga; Kazuya Yokota; Youichi Kuji; Masayuki Kuroki, all of Fuchu-cho (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/761,105

(22) Filed: Jan. 17, 2001

(30) Foreign Application Priority Data

Jan. 18, 2000 (JP) ........................................ 2000-013897

(51) Int. Cl.[7] ................................................. F01N 3/00
(52) U.S. Cl. ............................. 60/277; 60/276; 60/285; 60/301
(58) Field of Search ......................... 60/274, 277, 285, 60/276, 301

(56) References Cited

U.S. PATENT DOCUMENTS

| | | | |
|---|---|---|---|
| 5,713,199 A | | 2/1998 | Takeshima et al. |
| 6,134,882 A | * | 10/2000 | Huynh et al. .................. 60/274 |
| 6,171,565 B1 | * | 1/2001 | Hohne et al. .................. 60/274 |
| 6,185,929 B1 | * | 2/2001 | Ishizuka et al. ............... 60/277 |
| 6,216,448 B1 | * | 4/2001 | Schnaibel et al. ............. 60/277 |
| 6,216,450 B1 | * | 4/2001 | Takahashi et al. ............ 60/276 |
| 6,216,451 B1 | * | 4/2001 | Schnaibel et al. ............. 60/277 |
| 6,230,487 B1 | * | 5/2001 | Blumenstock et al. ........ 60/277 |
| 6,267,937 B1 | * | 7/2001 | Ma .......................... 423/213.2 |

FOREIGN PATENT DOCUMENTS

| | | |
|---|---|---|
| DE | 19801626 | 7/1999 |
| EP | 0903478 | 3/1999 |
| EP | 0950/801 | 10/1999 |
| JP | 8-260949 | 10/1996 |

OTHER PUBLICATIONS

European Search Report, Mar. 21, 2001, ., 3 pp.

* cited by examiner

Primary Examiner—Thomas Denion
Assistant Examiner—Diem Tran
(74) Attorney, Agent, or Firm—Nixon Peabody LLP; Donald R. Studebaker

(57) ABSTRACT

An exhaust-gas cleaning device comprises an absorption quantity detector (22) for determining the first and second amounts of $NO_x$ and oxygen absorbed by a $NO_x$-absorbing material and an oxygen-absorbing material during first and second reference times based on sensing signals fed from an oxygen concentration detector (11), a $NO_x$ quantity estimator (23) for obtaining first and second estimated values of the amount of $NO_x$ absorbed by the $NO_x$-absorbing material during the first and second reference times in accordance with engine operating condition, and a deterioration detector (24) for making a judgment on deterioration of the $NO_x$-absorbing material based on the first and second amounts of absorption of $NO_x$ and oxygen determined by the absorption quantity detector (22) and the first and second estimated values of the amount of $NO_x$ obtained by the $NO_x$ quantity estimator (23).

12 Claims, 7 Drawing Sheets

EXHAUST-GAS CLEANING DEVICES FOR ENGINE

BACKGROUND OF THE INVENTION AND RELATED ART STATEMENT

This invention relates to exhaust-gas cleaning devices for an engine installed on a motor vehicle, for example.

Conventionally, the amount of nitrogen oxides ($NO_x$) absorbed by a $NO_x$-absorbing material is detected for making a judgment on deterioration of the $NO_x$-absorbing material which is provided in an exhaust passage. Basically, the amount of $NO_x$ absorbed by the $NO_x$-absorbing material can be determined by examining the concentration of oxygen in exhaust gases that varies as $NO_x$ released from the $NO_x$-absorbing material is reduced. However, since an exhaust-gas converting catalyst, in which the $NO_x$-absorbing material is provided, occludes oxygen, it is impossible to say whether a change in the concentration of oxygen is caused by a release of the absorbed $NO_x$ or by a release of occluded oxygen by just detecting the change in oxygen concentration. It is therefore impossible to accurately determine the amount of the absorbed $NO_x$.

Under such circumstances, Japanese Unexamined Patent Publication No. 8-260949 proposes a deterioration detecting device for detecting deterioration of a $NO_x$-absorbing material provided in an exhaust passage, in which the $NO_x$-absorbing material absorbs $NO_x$ and stores oxygen when the air-fuel ratio of exhaust gas is high (lean exhaust gas), and releases the absorbed $NO_x$ and stored oxygen when the air-fuel ratio of the exhaust gas becomes low (rich exhaust gas). This deterioration detecting device comprises an air-fuel ratio sensor provided in the exhaust passage, downstream of the $NO_x$-absorbing material, for generating an output signal corresponding to the air-fuel ratio of the exhaust gas, an air-fuel ratio switcher which switches the air-fuel ratio of the exhaust gas from a higher value to a lower value when the amount of $NO_x$ absorbed in the $NO_x$-absorbing material is regarded as being almost zero, or more specifically, when the air-fuel ratio has been made high for a short time, and a stored oxygen quantity detector for detecting the amount of oxygen stored in the $NO_x$-absorbing material based on the output signal generated by the air-fuel ratio sensor when the air-fuel ratio of the exhaust gas flowing into the $NO_x$-absorbing material has been switched from a higher value to a lower value, wherein, after the air-fuel ratio has been made high for a long period by the air-fuel ratio switcher, the sum of the amount of oxygen stored in the $NO_x$-absorbing material and the amount of $NO_x$ absorbed in the $NO_x$-absorbing material is determined based on the output signal generated by the air-fuel ratio sensor when the air-fuel ratio of the exhaust gas flowing into the $NO_x$-absorbing material has been switched from the higher value to the lower value, and the amount of $NO_x$ absorbed in the $NO_x$-absorbing material is calculated by subtracting the amount of the stored oxygen from the aforementioned sum.

In the deterioration detecting device for detecting deterioration of the $NO_x$-absorbing material disclosed in the aforementioned Publication, it is assumed that the period of time required for the $NO_x$-absorbing material to store the greatest possible quantity (saturation level) of oxygen is sufficiently short and $NO_x$ is scarcely absorbed by the $NO_x$-absorbing material during this time period. Based on this assumption, the deterioration detecting device of regards a value detected from a change in the air-fuel ratio of the exhaust gas that occurs when the air-fuel ratio is switched to a lower value after once being made high for a short time as being representative of the amount of the stored oxygen, and calculates the amount of $NO_x$ absorbed in the $NO_x$-absorbing material from this detected value and the sum of the amount of the stored oxygen and the amount of $NO_x$. Even if the aforementioned time period is short, however, the amount of $NO_x$ absorbed in the $NO_x$-absorbing material is not zero and oxygen is produced when $NO_x$ released from the $NO_x$-absorbing material is reduced. Thus, the deterioration detecting device of the Publication has a problem that its accuracy of judgment on deterioration of the $NO_x$-absorbing material inevitably lowers due to errors occurring in detecting the amount of the stored oxygen.

An exhaust-gas cleaning device for an engine in which specific quantities of $NO_x$-absorbing material and oxygen-absorbing material are provided in an exhaust passage also has a problem that it becomes impossible to accurately calculate the amount of absorbed $NO_x$ in a manner disclosed in the aforementioned Patent Publication when the functioning of the oxygen-absorbing material deteriorates.

SUMMARY OF THE INVENTION

In view of the foregoing, it is an object of the invention to provide an exhaust-gas cleaning device for an engine capable to making a judgment on deterioration of a $NO_x$-absorbing material with a high degree of accuracy even when a specific quantity of $NO_x$-absorbing material and a large quantity of oxygen-absorbing material are provided in an exhaust passage of the engine.

In a principal form of the invention, an exhaust-gas cleaning device for an engine comprises a $NO_x$-absorbing material provided in an exhaust passage to absorb $NO_x$ under oxygen-rich conditions where the oxygen concentration is high and release absorbed $NO_x$ as the oxygen concentration decreases, an oxygen-absorbing material provided in the exhaust passage to absorb oxygen under oxygen-rich conditions where the oxygen concentration is high and release absorbed oxygen as the oxygen concentration decreases, an oxygen concentration controller for controlling the oxygen concentration in the exhaust passage, an oxygen concentration detector provided downstream of the $NO_x$-absorbing material and the oxygen-absorbing material, an absorption quantity detector which determines a first amount of absorption of $NO_x$ and oxygen absorbed by the $NO_x$-absorbing material and the oxygen-absorbing material based on a sensing signal fed from the oxygen concentration detector at a time when the oxygen concentration upstream of the $NO_x$-absorbing material and the oxygen-absorbing material is just transferred from a high concentration state maintained for a preset first reference time to a low concentration state by controlling the oxygen concentration with the oxygen concentration controller, and determines a second amount of absorption of $NO_x$ and oxygen absorbed by the $NO_x$-absorbing material and the oxygen-absorbing material based on a sensing signal fed from the oxygen concentration detector at a time when the oxygen concentration upstream of the $NO_x$-absorbing material and the oxygen-absorbing material is just transferred from the high concentration state maintained for a preset second reference time which is longer than the first reference time to the low concentration state by controlling the oxygen concentration with the oxygen concentration controller, a $NO_x$ quantity estimator which obtains a first estimated value of the amount of $NO_x$ absorbed by the $NO_x$-absorbing material during the first reference time and a second estimated value of the amount of $NO_x$ absorbed by the $NO_x$-absorbing material during the second reference time in accordance with engine operating condition, and a deterioration detector which makes a judgment on deterioration of the $NO_x$-absorbing material based on the first amount of absorption and the second amount of absorption of $NO_x$ and oxygen determined by the absorption quantity detector and the first estimated value and the second estimated value of the amount of absorbed $NO_x$ obtained by the $NO_x$ quantity estimator.

In the exhaust-gas cleaning device thus constructed, the judgment on deterioration of the $NO_x$-absorbing material is made based on the first and the second amounts of absorption of $NO_x$ and oxygen determined by the absorption quantity detector and the first and the second estimated values of the amount of absorbed $NO_x$ obtained by the $NO_x$ quantity estimator. It is therefore possible to perform the deterioration judgment operation in a proper manner taking into account the amount of $NO_x$ absorbed in the $NO_x$-absorbing material during the first reference time. When a three-way catalytic converter is provided upstream of the $NO_x$-absorbing material, for instance, the three-way catalytic converter at a low temperature can be activated by reacting unburned fuel in exhaust gas with oxygen released from the oxygen-absorbing material. Modern exhaust-gas cleaning devices comprising a large quantity of oxygen-absorbing material in the three-way catalytic converter have a problem that the $NO_x$-absorbing material tends to be wrongly judged undeteriorated despite the fact that it is already deteriorated, because a reference calculation time set for calculating the amount of oxygen absorbed in the oxygen-absorbing material required for saturating it can not be sufficiently shortened and a specific amount of $NO_x$ is absorbed by the $NO_x$-absorbing material during the reference calculation time, making it impossible to accurately determine the amount of oxygen absorbed in the oxygen-absorbing material. It is possible to overcome this problem of the prior art by employing the aforementioned construction of the invention.

According to a unique feature of the invention, the exhaust-gas cleaning device is constructed such that the deterioration detector makes a judgment on deterioration of the $NO_x$-absorbing material based on the difference between the second amount of absorption and the first amount of absorption of $NO_x$ and oxygen determined by the absorption quantity detector and the difference between the second estimated value and the first estimated value of the amount of $NO_x$ obtained by the $NO_x$ quantity estimator.

In this construction, the deterioration detector makes a judgment on whether or not a specified quantity of $NO_x$ is absorbed in the $NO_x$-absorbing material in a proper manner based on, for example, the ratio of the difference between the second amount of absorption and the first amount of absorption of $NO_x$ and oxygen determined by the absorption quantity detector to the difference between the second estimated value and the first estimated value of the amount of $NO_x$ obtained by the $NO_x$ quantity estimator.

According to another feature of the invention, the $NO_x$ quantity estimator obtains the first estimated value and the second estimated value of the amount of $NO_x$ absorbed by the $NO_x$-absorbing material in accordance with engine speed and engine load.

In this construction, the first estimated value and the second estimated value of the amount of $NO_x$ corresponding to the operating condition of the engine can be read from a map defined using the engine speed and engine load as parameters, for instance.

In another principal form of the invention, an exhaust-gas cleaning device for an engine comprises a $NO_x$-absorbing material provided in an exhaust passage to absorb $NO_x$ under oxygen-rich conditions where the oxygen concentration is high and release absorbed $NO_x$ as the oxygen concentration decreases, an oxygen-absorbing material provided in the exhaust passage to absorb oxygen under oxygen-rich conditions where the oxygen concentration is high and release absorbed oxygen as the oxygen concentration decreases, an oxygen concentration controller for controlling the oxygen concentration in exhaust gas, an oxygen concentration detector provided downstream of the $NO_x$-absorbing material and the oxygen-absorbing material, an absorption quantity detector which determines a first amount of absorption of $NO_x$ and oxygen absorbed by the $NO_x$-absorbing material and the oxygen-absorbing material based on a sensing signal fed from the oxygen concentration detector at a time when the oxygen concentration upstream of the $NO_x$-absorbing material and the oxygen-absorbing material is just transferred from a high concentration state maintained for a preset first reference time to a low concentration state by controlling the oxygen concentration with the oxygen concentration controller, and determines a second amount of absorption of $NO_x$ and oxygen absorbed by the $NO_x$-absorbing material and the oxygen-absorbing material based on a sensing signal fed from the oxygen concentration detector at a time when the oxygen concentration upstream of the $NO_x$-absorbing material and the oxygen-absorbing material is just transferred from the high concentration state maintained for a preset second reference time which is longer than the first reference time to the low concentration state by controlling the oxygen concentration with the oxygen concentration controller, a first deterioration detector which makes a judgment on deterioration of the $NO_x$-absorbing material based on the first amount of absorption and the second amount of absorption of $NO_x$ and oxygen determined by the absorption quantity detector, and a second deterioration detector which makes a judgment on deterioration of the oxygen-absorbing material, wherein the judgment on deterioration of the $NO_x$-absorbing material by the first deterioration detector is inhibited when the oxygen-absorbing material has been judged to have deteriorated by the second deterioration detector.

In the exhaust-gas cleaning device thus constructed, the second deterioration detector judges whether or not the oxygen-absorbing material has deteriorated, and if it is judged undeteriorated, the first deterioration detector properly judges whether or not the $NO_x$-absorbing material has deteriorated based on the second amount of absorption of $NO_x$ and oxygen absorbed by the $NO_x$-absorbing material and the oxygen-absorbing material determined by the absorption quantity detector. On the other hand, when the oxygen-absorbing material is judged to have deteriorated, the judgment on deterioration of the $NO_x$-absorbing material by the first deterioration detector is inhibited to thereby prevent misjudgment by the first deterioration detector potentially caused by the deterioration of the oxygen-absorbing material. Therefore, this construction serves to improve the accuracy of judgment on deterioration of the $NO_x$-absorbing material by the first deterioration detector.

According to a feature of the invention, the absorption quantity detector is so constructed as to determine the amount of $NO_x$ and oxygen absorbed by the $NO_x$-absorbing material and the oxygen-absorbing material based on the time period required for the oxygen concentration detected by the oxygen concentration detector to decrease to a specific low concentration level from a point in time when the oxygen concentration controller executes a control operation for transferring the oxygen concentration upstream of the $NO_x$-absorbing material and the oxygen-absorbing material from the high concentration state to the low concentration state.

In this construction, the first and second amounts of absorption of $NO_x$ and oxygen absorbed by the $NO_x$-absorbing material and the oxygen-absorbing material are obtained as large values when the time period required for the oxygen concentration detected by the oxygen concentration detector to decrease to the specific low concentration level from the point in time when the oxygen concentration controller executes the control operation for transferring the oxygen concentration upstream of the $NO_x$-absorbing material and the oxygen-absorbing material from the high concentration state to the low concentration state is long. Contrary to this, when the aforementioned time period is short, the first and second amounts of absorption of $NO_x$ and oxygen absorbed by the $NO_x$-absorbing material and the oxygen-absorbing material are obtained as small values.

According to another feature of the invention, the oxygen concentration controller is so constructed as to control the oxygen concentration in the exhaust passage by controlling the air-fuel ratio in a combustion chamber.

In this construction, the control operation for transferring the oxygen concentration of the exhaust gas discharged from the engine into the exhaust passage from the high concentration state maintained for the preset first reference time to the low concentration state and from the high concentration state maintained for the preset second reference time to the low concentration state is performed by controlling the air-fuel ratio in the combustion chamber with the oxygen concentration controller and, then, the absorption quantity detector determines the first and second amounts of absorption of $NO_x$ and oxygen.

According to still another feature of the invention, the oxygen-absorbing material is provided upstream of the $NO_x$-absorbing material.

This construction makes it possible to improve exhaust-gas cleaning performance at low temperatures by using a large quantity of the oxygen-absorbing material. When the exhaust gas in the exhaust passage transfers from an oxygen-rich state to a state in which the oxygen concentration has decreased, oxygen released from the oxygen-absorbing material is supplied to the $NO_x$-absorbing material downstream of the oxygen-absorbing material. Since oxygen produced when $NO_x$ released from the $NO_x$-absorbing material is reduced and oxygen released from the oxygen-absorbing material together affect oxygen concentration values detected by the oxygen concentration detector, significant effects are obtained by making a judgment on deterioration of the $NO_x$-absorbing material taking into account the amount of $NO_x$ absorbed by the $NO_x$-absorbing material during the first reference time as stated above.

It will be recognized from the foregoing that the present invention confers such advantageous effects that an exhaust-gas cleaning device for an engine in which a specific quantity of $NO_x$-absorbing material and a large quantity of oxygen-absorbing material are provided in an exhaust passage can make a judgment on deterioration of the $NO_x$-absorbing material with a high degree of accuracy.

These and other objects, features and advantages of the invention will become more apparent upon a reading of the following detailed description in conjunction with the accompanying drawings.

DETAILED DESCRIPTION OF THE PREFERRED EMBODIMENTS OF THE INVENTION

Figure 1:
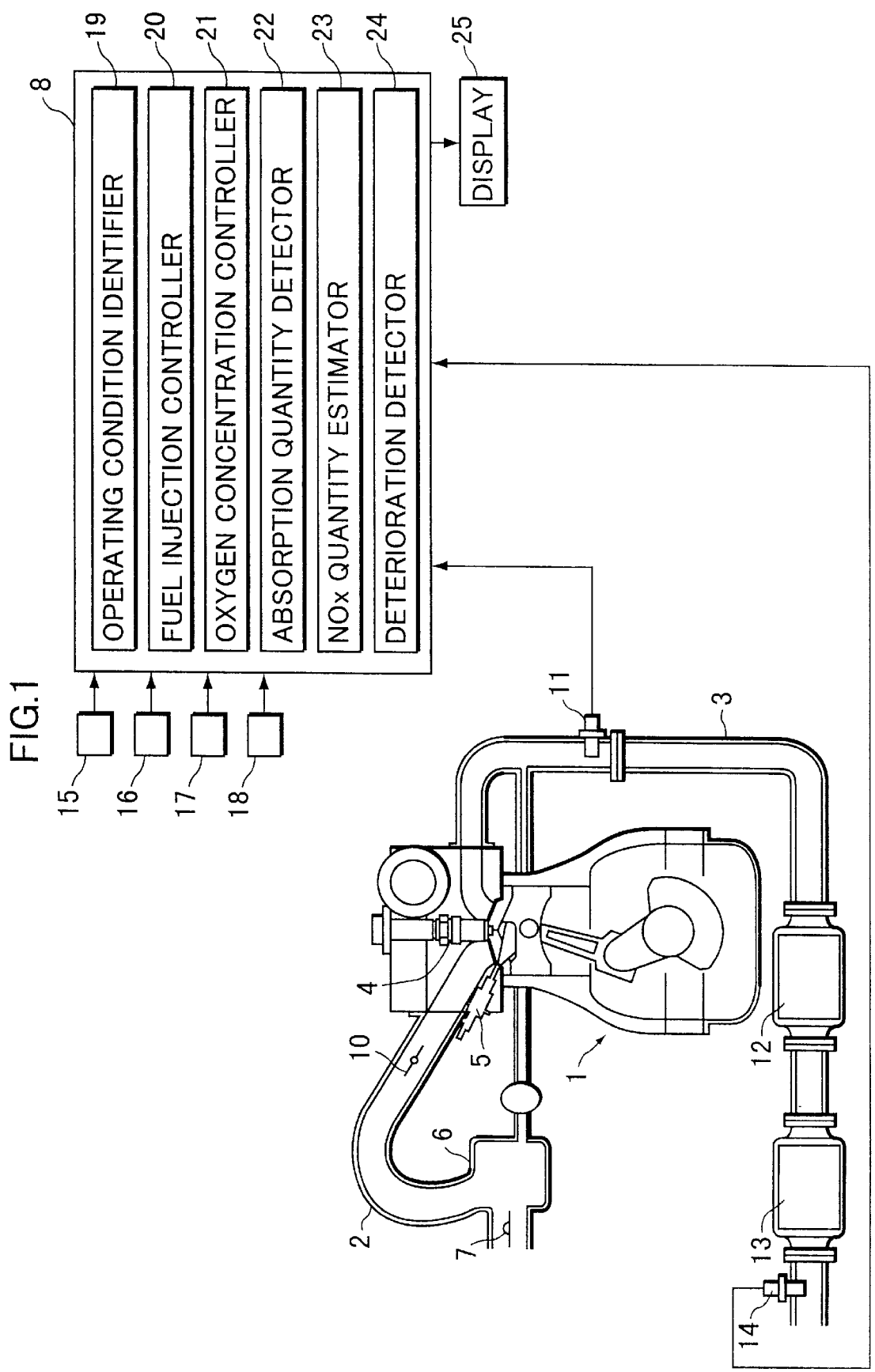
FIG. 1 is an explanatory diagram showing an exhaust-gas cleaning device for an engine according to a preferred embodiment of the invention.

FIG. 1 is an explanatory diagram showing an exhaust-gas cleaning device for a direct injection gasoline engine according to a preferred embodiment of the invention. A control system of the engine to be installed on a motor vehicle comprises an intake passage 2 and an exhaust passage 3 connected to an engine body 1, a spark plug 4 fitted at the top of a combustion chamber of the engine body 1, and a fuel injector 5 for injecting fuel directly into the combustion chamber.

A surge tank 6 is provided in the intake passage 2 with a throttle valve 7 provided upstream of the surge tank 6. Driven by an electric actuator which operates in accordance with a control signal output from an engine control unit (ECU) 8, the throttle valve 7 regulates the amount of intake air introduced into the combustion chamber. An intake shutter valve 10 for creating a swirl and an intake valve (not shown) for opening and closing an intake port are provided downstream of the surge tank 6.

An exhaust valve (not shown) for opening and closing an exhaust port is provided in the exhaust passage 3. Further, a first oxygen concentration detector 11 formed mainly of a $\lambda O_2$ sensor for detecting the concentration of oxygen contained in exhaust gas expelled through the exhaust port, a three-way catalytic converter 12 which reduces $NO_x$, carbon monoxide (CO) and hydrocarbons (HC) under conditions where the air-fuel ratio of the exhaust gas is close to the stoichiometric air-fuel ratio, a lean $NO_x$ catalytic converter 13 which reduces $NO_x$ even under oxygen-rich conditions, and a second oxygen concentration detector 14 formed mainly of a linear $O_2$ sensor for detecting the air-fuel ratio of the exhaust gas output from the lean $NO_x$ catalytic converter 13 are provided in the exhaust passage 3 in this order from the upstream side.

The three-way catalytic converter 12 includes an oxygen-absorbing material formed of ceria ($CeO_2$) which absorbs oxygen during lean mixture running in which the air-fuel ratio of an air-fuel mixture in the combustion chamber is larger than the stoichiometric air-fuel ratio, or under oxygen-rich conditions where the oxygen concentration in the exhaust gas is high (approximately 0.5% or above), and releases oxygen under oxygen-poor conditions where the oxygen concentration in the exhaust gas is low (less than approximately 0.5%). The three-way catalytic converter 12 thus constructed simultaneously oxidizes HC and CO and reduces $NO_x$ to remove or decrease these pollutants.

The lean $NO_x$ catalytic converter 13 includes a $NO_x$-absorbing material formed of alkali metal (especially potassium), alkaline-earth metal (especially barium) or rare-earth metal which absorbs $NO_x$ under oxygen-rich conditions where the oxygen concentration in the exhaust gas is high (approximately 4% or above), and releases $NO_x$ under oxygen-poor conditions where the oxygen concentration in the exhaust gas is low (less than approximately 0.5% to 1%). The lean $NO_x$ catalytic converter 13 thus constructed causes the $NO_x$-absorbing material to absorb $NO_x$ under oxygen-rich conditions and release $NO_x$ as the exhaust gas becomes poor in oxygen, and purify the exhaust gas by reducing $NO_x$ as a result of an action of catalytic metal, such as noble metal, which is located around the $NO_x$-absorbing material.

As an alternative, the lean $NO_x$ catalytic converter 13 may also include an oxygen-absorbing material formed of ceria ($CeO_2$). In this alternative construction, oxygen absorbed by the oxygen-absorbing material under oxygen-rich conditions where the oxygen concentration in the exhaust gas is high is released as the oxygen concentration drops, and oxygen thus released is caused to react with CO contained in the exhaust gas, whereby the lean $NO_x$ catalytic converter 13 can be heated and maintained at appropriate temperatures.

Referring to FIG. 1, the engine is provided with various sensors, such as an airflow sensor 15 for detecting the amount of intake air passing through the intake passage 2, a crank angle sensor 16 for detecting engine speed, an accelerator pedal stroke sensor 17 and an engine cooling water temperature sensor 18. Sensing signals from these sensors are entered to the ECU 8.

The ECU 8 includes an operating condition identifier 19 for judging the operating condition of the engine, a fuel injection controller 20 for controlling the amount of injected fuel and injection timing, an oxygen concentration controller 21 for controlling the oxygen concentration in the exhaust passage 3 by controlling the air-fuel ratio in the combustion chamber, an absorption quantity detector 22 for detecting the amount of $NO_x$ and oxygen absorbed by the $NO_x$-absorbing material of the lean $NO_x$ catalytic converter 13 and the oxygen-absorbing material of the three-way catalytic converter 12 based on a sensing signal fed from the second oxygen concentration detector 14, a $NO_x$ quantity estimator 23 for calculating estimated quantities of $NO_x$ absorbed by the $NO_x$-absorbing material, and a deterioration detector 24 for making a judgment on deterioration of the $NO_x$-absorbing material.

The operating condition identifier 19 judges whether the engine is operating in a uniform charge combustion range under high-load, high-to-low speed conditions or in a stratified charge combustion range under low-load, low-speed conditions, for example, based on an engine speed value detected by the crank angle sensor 16 and an engine load value detected by the accelerator pedal stroke sensor 17, and transmits resultant judgment data to the fuel injection controller 20.

The fuel injection controller 20 reads out a target engine torque from a predefined map based on accelerator pedal stroke detected by the accelerator pedal stroke sensor 17 and the engine speed detected by the crank angle sensor 16, reads out a target fuel injection quantity from a predefined map according to the target torque and the actual amount of intake air detected by the airflow sensor 15, and transmits a control signal corresponding to the target fuel injection quantity to the fuel injector 5.

The fuel injection controller 20 also controls fuel injection timing in accordance with the engine operating condition determined by the operating condition identifier 19. When the engine is already warm and operating in the uniform charge combustion range under high-load, high-to-low speed conditions, for example, the fuel injection controller 20 performs a control operation for injecting the fuel during an intake stroke to produce uniform charge combustion. When the engine is operating in the stratified charge combustion range under low-load, low-speed conditions, on the other hand, the fuel injection controller 20 performs a control operation for injecting the fuel in a latter part of a compression stroke to produce stratified charge combustion.

The oxygen concentration controller 21 controls the amount of intake air by transmitting a control signal corresponding to the engine operating condition to the actuator of the throttle valve 7 in such a way that the air-fuel ratio in a cylinder becomes far higher than the stoichiometric air-fuel ratio in the stratified charge combustion range and the air-fuel ratio in the cylinder becomes richer in the uniform charge combustion range than in stratified charge combustion range.

The oxygen concentration controller 21 also controls the oxygen concentration in the exhaust gas by regulating the amount of injected fuel in a manner described below referring to FIG. 2A to enable the deterioration detector 24 to make a judgment on deterioration of the $NO_x$-absorbing material during steady-state engine operation. Specifically, the oxygen concentration controller 21 first makes a setting to produce a rich mixture at a starting point O of a deterioration judgment control operation, and at a point T1 in time when a specific time (approximately 2 to 5 seconds) has elapsed from the starting point O, the oxygen concentration controller 21 makes a setting to produce a lean mixture such that the oxygen concentration in the exhaust gas upstream of the three-way catalytic converter 12 and the lean $NO_x$ catalytic converter 13 becomes high. Then, at a point T2 in time when this high oxygen concentration state has been maintained for a first reference time t1, which is set to approximately 10 to 20 seconds, the oxygen concentration controller 21 makes a setting to produce a rich mixture to thereby transfer the exhaust gas to a low oxygen concentration state.

At a point T3 in time when a specific time (approximately 2 to 5 seconds) has elapsed from the point T2, the oxygen concentration controller 21 makes a setting to produce a lean mixture for creating a high oxygen concentration state in the exhaust gas. At a point T4 in time when this high oxygen concentration state has been maintained for a second reference time t2, which is set to approximately 150 seconds, the oxygen concentration controller 21 makes a setting to produce a rich mixture again to thereby transfer the exhaust gas to a low oxygen concentration state. Then, at a point T5 in time when a specific time (approximately 2 to 5 seconds) has elapsed from the point T4, the deterioration judgment control operation is finished and an ordinary control state is restored.

When making a judgment on deterioration of the $NO_x$-absorbing material by the deterioration judgment control operation mentioned above, the oxygen concentration controller 21 performs a control operation to make the amount of fuel injected during the first reference time t1 smaller than that injected during the second reference time t2 such that the air-fuel mixture becomes significantly leaner during the first reference time t1 than during the second reference time t2.

The absorption quantity detector 22 determines the amounts of $NO_x$ and oxygen absorbed by the $NO_x$-absorbing material of the lean $NO_x$ catalytic converter 13 and the oxygen-absorbing material of the three-way catalytic converter 12 based on time periods TAo and TBo shown in FIG. 2B required for the oxygen concentration detected by the second oxygen concentration detector 14 to decrease to a specific low concentration level from the aforementioned points T2 and T4, respectively, at which the oxygen concentration controller 21 completes the setting for transferring the exhaust gas upstream of the $NO_x$-absorbing material and the oxygen-absorbing material from the high oxygen concentration state to the low oxygen concentration state.

Specifically, when the setting for transferring the exhaust gas to the low oxygen concentration state has been made at the points T2 and T4 at which the oxygen concentration controller 21 completes the operation for creating the high oxygen concentration state in the exhaust gas performed during the first and second reference times t1, t2, $NO_x$ and oxygen absorbed by the $NO_x$-absorbing material and the oxygen-absorbing material are released. Therefore, the oxygen concentration value detected by the second oxygen concentration detector 14 does not immediately change to a value representative of a low oxygen concentration state, but the detected value reaches a value equal to a specific value O2o representative of the low oxygen concentration state at a time when the time period TAo (TBo) has just elapsed.

Since the time periods TAo and TBo required for the oxygen concentration detected by the second oxygen concentration detector 14 to transfer to the low oxygen concentration level from the points T2 and T4, respectively, vary depending on the amount of $NO_x$ and oxygen absorbed by the $NO_x$-absorbing material and the oxygen-absorbing material, it is possible to determine the amount of $NO_x$ and oxygen absorbed by the $NO_x$-absorbing material of the lean $NO_x$ catalytic converter 13 and the oxygen-absorbing material of the three-way catalytic converter 12 in terms of values corresponding to the time periods TAo and TBo by means of the absorption quantity detector 22.

The amount of $NO_x$ absorbed by the $NO_x$-absorbing material of the lean $NO_x$ catalytic converter 13 and the oxygen-absorbing material of the three-way catalytic converter 12 varies with the amount of $NO_x$ discharged from the engine into the exhaust passage 3 which varies in accordance with the operating condition of the engine. Thus, the $NO_x$ quantity estimator 23 obtains a first estimated value of the amount of $NO_x$ absorbed by the $NO_x$-absorbing material during the first reference time t1 and a second estimated value of the amount of $NO_x$ absorbed by the $NO_x$-absorbing material during the second reference time t2 by reading out the amount of $NO_x$ corresponding to the operating condition of the engine from a map defined using the engine speed and engine load as parameters.

The deterioration detector 24 calculates the difference between a second amount of absorption and a first amount of absorption of $NO_x$ and oxygen detected by the absorption quantity detector 22 as well as the difference between the second estimated value and the first estimated value of the amount of $NO_x$ obtained by the $NO_x$ quantity estimator 23. The deterioration detector 24 then makes a judgment on deterioration of the $NO_x$-absorbing material by judging whether the ratio between the above two differences has changed. If the $NO_x$-absorbing material is judged to have deteriorated, the deterioration detector 24 transmits a control signal to a display 25, causing it to indicate an anomaly of the exhaust-gas cleaning device.

Figure 3:
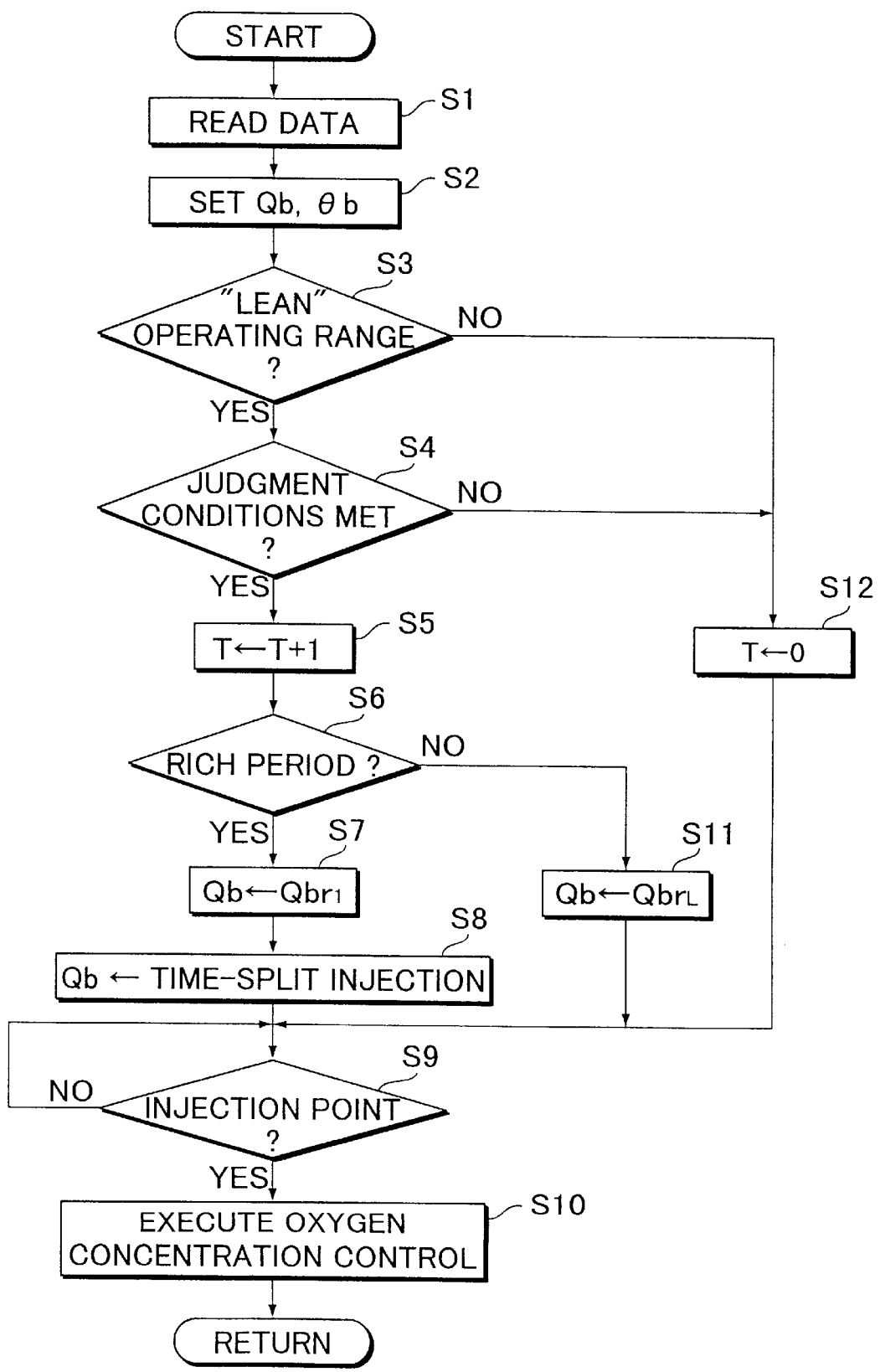
FIG. 3 is a flowchart showing an air-fuel ratio control operation.

An air-fuel ratio control operation performed by the engine exhaust-gas cleaning device of the present embodiment is now described referring to a flowchart shown in FIG. 3. Following the start of the control operation of the flowchart, data detected by the individual sensors are entered to the ECU 8 (step S1). The ECU 8 then reads out and sets a basic fuel injection quantity Qb and a basic injection point θb corresponding to the engine operating condition from a map (step S2) and judges whether the engine is in a "lean" operating range (step S3).

If it is determined that the engine is in the "lean" operating range (YES in step S3), a further judgment is made to check whether conditions for determining that the $NO_x$-absorbing material has deteriorated have been satisfied (step S4). More specifically, whether or not the deterioration judgment conditions have been met is judged by verifying that the engine is in a warm operating state, steady-state engine operation has continued for a specific period of time, and the $NO_x$-absorbing material has not been judged to have deteriorated yet.

Figure 2:
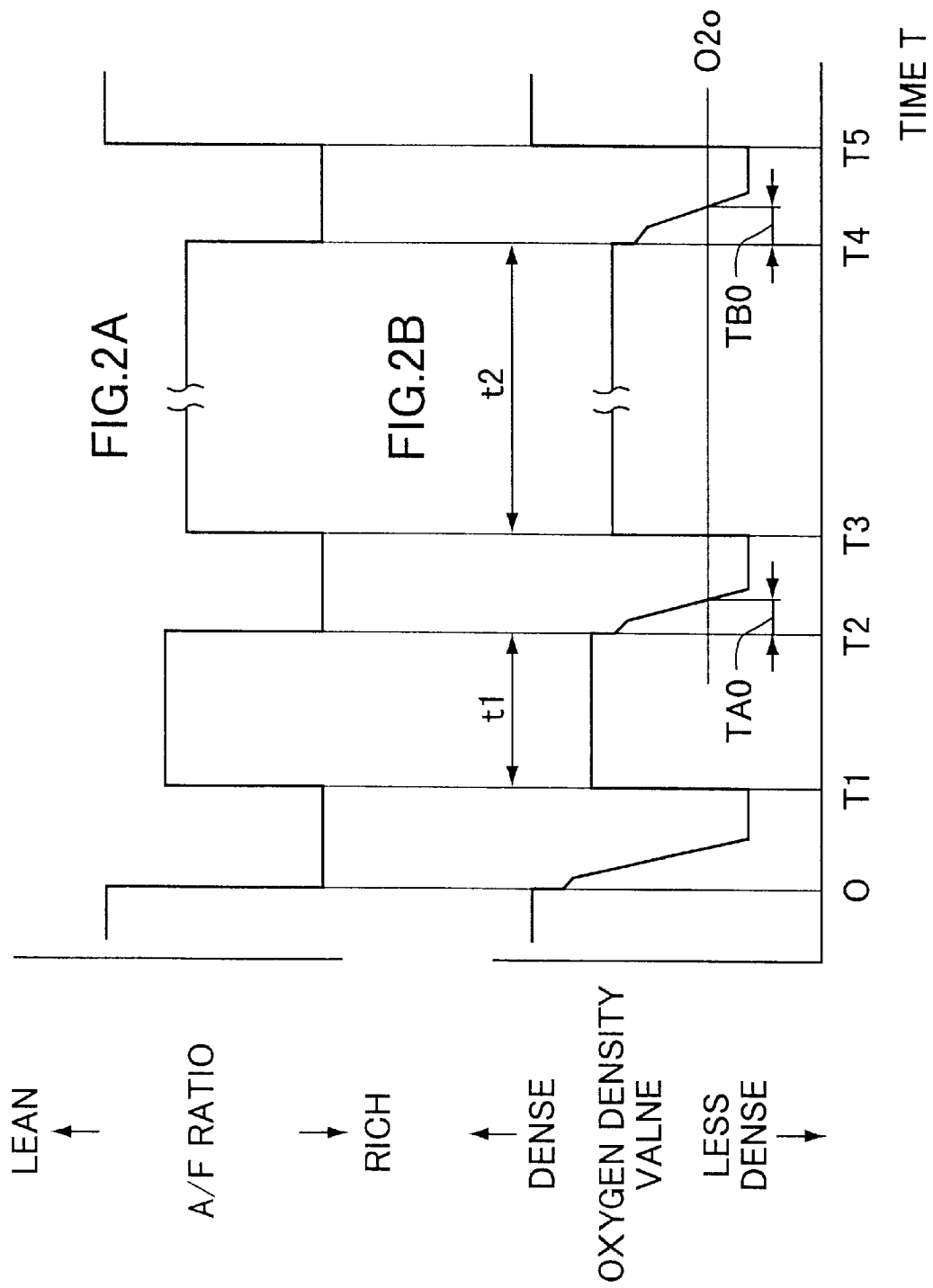
FIGS. 2A–2B are time charts showing how the air-fuel ratio and oxygen concentration detection value vary during a deterioration judgment control operation.

If the judgment result in step S4 is in the affirmative, the count value of deterioration judgment time T which is counted by a deterioration judgment timer is incremented by 1 (step S5), and a further judgment is made to determine whether the count value of the deterioration judgment time T exists in one of "rich" periods shown in FIG. 2, that is, the period between the points O and T1, the period between the points T2 and T3, or the period between the points T4 and T5, (step S6).

If it is determined that the count value of the deterioration judgment time T exists in a "rich" period (YES in step S6), the basic fuel injection quantity Qb of the fuel is set to a value Qbr1 which makes the excess-air factor λ equal to or less than 1 (step S7) and the basic injection point θb is set such that the fuel is separately injected in the intake and compression strokes (step S8). Subsequently, a judgment is made to determine whether a fuel injection point has been reached (step S9). When the judgment result in step S9 becomes YES, an injection control operation is executed to inject the fuel (step S10), whereby an oxygen concentration control operation in the deterioration judgment operation is performed.

On the other hand, if it is determined that the count value of the deterioration judgment time T exists in one of "lean" periods shown in FIG. 2, that is, the period between the points T1 and T2, or the period between the points T3 and T4, (NO in step S6), the basic fuel injection quantity Qb of the fuel is set to a value Qb1 which makes the excess-air factor λ larger than 1 (step S11) and the operation flow proceeds to step S9, whereby an oxygen concentration control operation in the deterioration judgment operation is performed. If the count value of the deterioration judgment time T exists in the period corresponding to the earlier-mentioned first reference time t1 (between the points T1 and T2), the basic fuel injection quantity Qb1 is set such that the air-fuel ratio becomes higher (to produce a leaner mixture) than when the count value of the deterioration judgment time T exists in the period corresponding to the earlier-mentioned second reference time t2 (between the points T3 and T4).

Also, if it is determined that the engine is not in the "lean" operating range (NO in step S3), or if it is determined that the deterioration judgment conditions for the $NO_x$-absorbing material have not been met (NO in step S4), the deterioration judgment timer is initialized to reset the count value of the deterioration judgment time T to 0 (step S12) and the operation flow proceeds to step S9.

Figure 4:
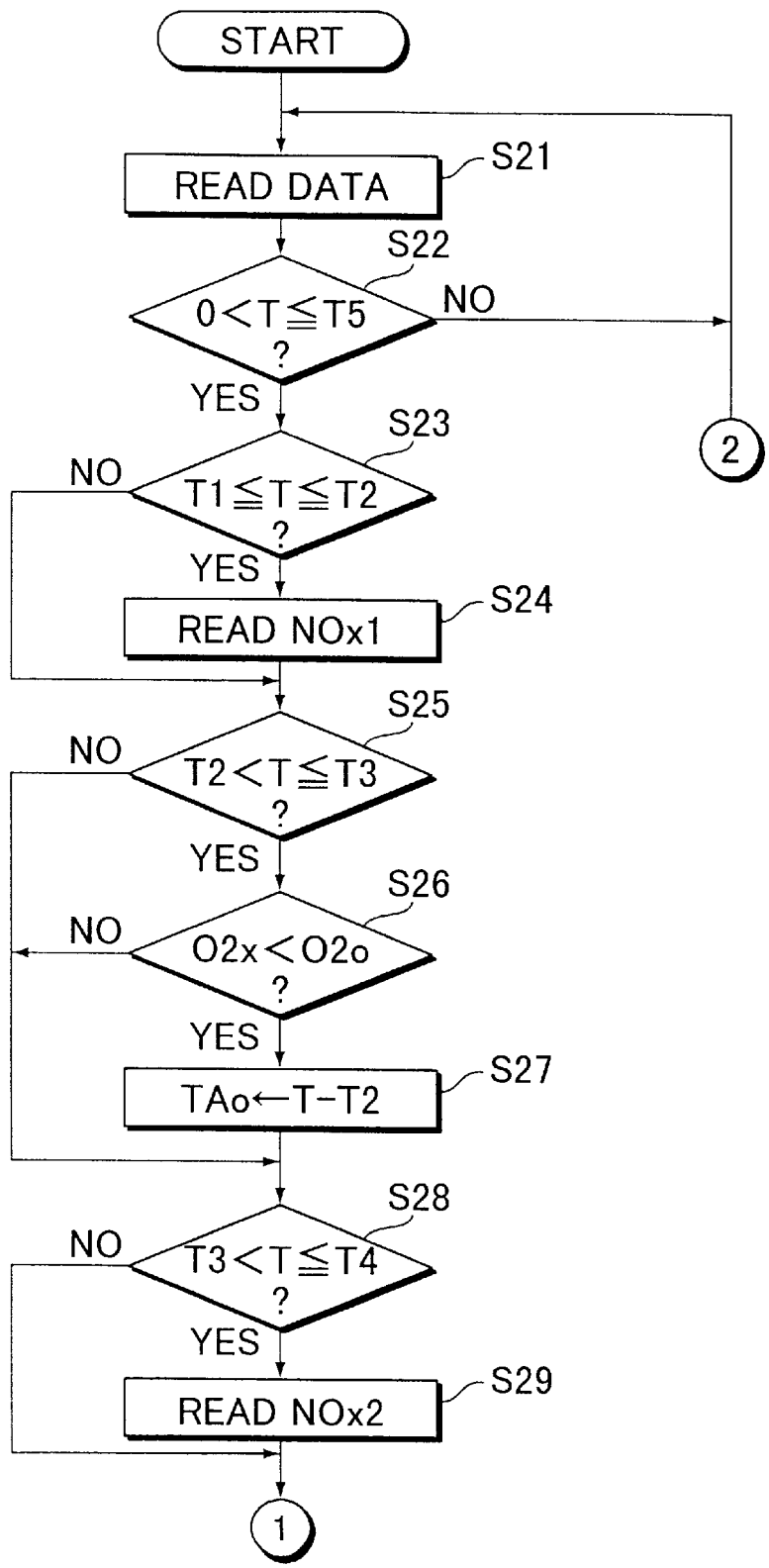
FIG. 4 shows a first half of a flowchart of a deterioration judgment control operation.
Figure 5:
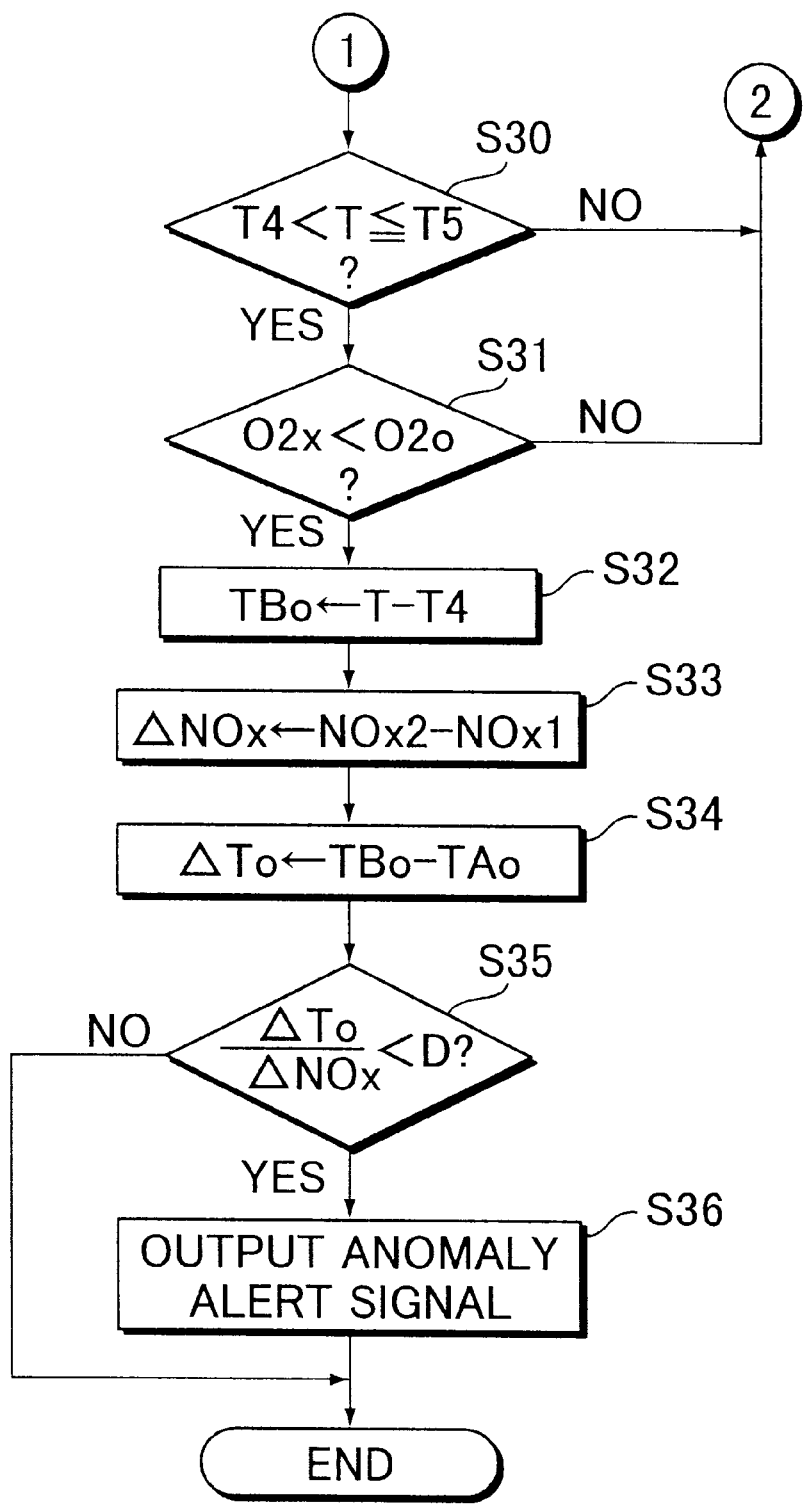
FIG. 5 shows a second half of the flowchart of the deterioration judgment control operation.

Next, the aforementioned deterioration judgment control operation for making a judgment on deterioration of the $NO_x$-absorbing material performed by the exhaust-gas cleaning device of the embodiment is described referring to a flowchart shown in FIGS. 4 and 5. Following the start of this control operation, data detected by the individual sensors are entered to the ECU 8 (step S21), and a judgment is made to determine whether the value of the deterioration judgment time T counted by the deterioration judgment timer exists in the period between the starting point O and the ending point T5 of the deterioration judgment control operation (step S22).

If the judgment result in step S22 is in the affirmative, a further judgment is made to determine whether the count value of the deterioration judgment time T exists in the period corresponding to the first reference time t1 (T1 to T2) (step S23). If the judgment result in step S23 is in the affirmative (T1 T T2), the $NO_x$ quantity estimator 23 reads out the first estimated value $NO_x1$ of the amount of $NO_x$ absorbed by the $NO_x$-absorbing material during the first reference time t1 from a map (not shown) in accordance with the engine operating condition (step S24).

On the other hand, if it is determined that the count value of the deterioration judgment time T does not exist in the period corresponding to the first reference time t1 (T1 to T2) (NO in step S23), a further judgment is made to determine whether the count value of the deterioration judgment time T exists in the "rich" period (T2 to T3) immediately following the first reference time t1 (step S25). If the judgment result in step S25 is in the affirmative (T2<T<T3), a further judgment is made to determine whether the oxygen concentration value $O2_x$ detected by the second oxygen concentration detector 14 has reached the specific value O2o representative of a low oxygen concentration state (step S26).

If the judgment result in step S26 is in the affirmative, the absorption quantity detector 22 sets the time period (T–T2) elapsed from the end point T2 of the first reference time t1 to the current deterioration judgment time T as a value corresponding to the first amount of absorption TAo of $NO_x$ and oxygen absorbed by the $NO_x$-absorbing material of the lean $NO_x$ catalytic converter 13 and the oxygen-absorbing material of the three-way catalytic converter 12 during the first reference time t1, and determines this first amount of absorption TAo (step S27).

Next, it is judged whether the count value of the deterioration judgment time T exists in the period corresponding to the second reference time t2 (T3 to T4) (step S28). If the judgment result in step S28 is in the affirmative (T3<T<T4), the $NO_x$ quantity estimator 23 reads out the second estimated value $NO_x2$ of the amount of $NO_x$ absorbed by the $NO_x$-absorbing material during the second reference time t2 from a map (not shown) in accordance with the engine operating condition (step S29).

Then, it is judged whether the count value of the deterioration judgment time T exists in the "rich" period (T4 to T5) immediately following the second reference time t2 (step S30). If the judgment result in step S30 is in the affirmative (T4<T<T5), a further judgment is made to determine whether the oxygen concentration value $O2_x$ detected by the second oxygen concentration detector 14 has reached the specific value O2o representative of a low oxygen concentration state (step S31).

If the judgment result in step S31 is in the affirmative, the absorption quantity detector 22 sets the time period (T–T4) elapsed from the end point T4 of the second reference time t2 to the current deterioration judgment time T as a value corresponding to the second amount of absorption TBo of $NO_x$ and oxygen absorbed by the $NO_x$-absorbing material of the lean $NO_x$ catalytic converter 13 and the oxygen-absorbing material of the three-way catalytic converter 12 during the second reference time t2, and determines this second amount of absorption TBo (step S32).

Subsequently, the difference $NO_x$ between the second estimated value $NO_x2$ and the first estimated value $NO_x1$ is obtained by subtracting the first estimated value $NO_x1$ of the amount of $NO_x$ obtained in step S24 from the second reference time t2 of the amount of $NO_x$ obtained in step S29 (step S33), and the difference To between the second amount of absorption TBo obtained in step S32 and the first amount of absorption TAo obtained in step S27 is calculated (step S34).

Here, a judgment is made to determine whether the ratio To/ $NO_x$ of the two differences is smaller than a reference value D (step S35) to judge whether or not deterioration of the $NO_x$-absorbing material has occurred. If the judgment result in step S35 is in the affirmative, the $NO_x$-absorbing material is judged to have deteriorated and the deterioration detector 24 transmits a control signal to the display 25, causing it to indicate the anomaly of the exhaust-gas cleaning device (step S36). If, on the other hand, the judgment result in step S35 is in the negative, the $NO_x$-absorbing material is judged to have not deteriorated yet, the above-described deterioration judgment control operation is finished.

Since oxygen absorbed by the $NO_x$-absorbing material of the lean $NO_x$ catalytic converter 13 and the oxygen-absorbing material of the three-way catalytic converter 12 reaches a saturation level in a relatively short time, the greatest possible quantities (saturation level) of oxygen are supposed to be absorbed in the $NO_x$-absorbing material and the oxygen-absorbing material. Thus, it is possible to obtain the difference To between the amount of $NO_x$ absorbed by the $NO_x$-absorbing material during the second reference time t2 and the amount of $NO_x$ absorbed by the $NO_x$-absorbing material during the first reference time t1 by subtracting the first amount of absorption TAo of $NO_x$ and oxygen obtained in step S27 from the second amount of absorption TBo of $NO_x$ and oxygen obtained in step S32.

The difference $NO_x$ obtained by subtracting the first estimated value $NO_x1$ of the amount of $NO_x$ obtained in step S24 from the second reference time t2 of the amount of $NO_x$ obtained in step S29 gives an estimated value of the difference between the amount of $NO_x$ absorbed by the $NO_x$-absorbing material during the second reference time t2 and the amount of $NO_x$ absorbed by the $NO_x$-absorbing material during the first reference time t1. Therefore, if it is assumed that the result of estimation given by the $NO_x$ quantity estimator 23 is correct and a rated amount of $NO_x$ is absorbed in the $NO_x$-absorbing material, the ratio To/ $NO_x$ of the aforementioned two differences takes an approximately fixed value.

On the contrary, if it is determined that the ratio To/ $NO_x$ of the two differences is smaller than the predefined reference value D, the amount of $NO_x$ absorbed by the $NO_x$-absorbing material is much smaller than the rated amount, so that the $NO_x$-absorbing material is judged to have deteriorated.

As shown in the foregoing discussion, the exhaust-gas cleaning device of the embodiment is so constructed as to determine the first amount of absorption TAo of $NO_x$ and oxygen absorbed by the $NO_x$-absorbing material and the oxygen-absorbing material based on the sensing signal fed from the second oxygen concentration detector 14 at the point in time when the exhaust gas upstream of the $NO_x$-absorbing material and the oxygen-absorbing material is just transferred from the high concentration state maintained for the preset first reference time t1 to the low concentration state by controlling the oxygen concentration in the exhaust gas with the oxygen concentration controller 21, determine the second amount of absorption TBo of $NO_x$ and oxygen absorbed by the $NO_x$-absorbing material and the oxygen-absorbing material based on the sensing signal fed from the second oxygen concentration detector 14 at the point in time when the exhaust gas is just transferred from the high concentration state maintained for the preset second reference time t2, which is longer than the first reference time t1, to the low concentration state by controlling the oxygen concentration in the exhaust gas with the oxygen concentration controller 21, obtain the first estimated value $NO_x1$ of the amount of $NO_x$ absorbed by the $NO_x$-absorbing material during the first reference time t1 and the second estimated value $NO_x2$ of the amount of $NO_x$ absorbed by the $NO_x$-absorbing material during the second reference time t2 in accordance with the engine operating condition, and make a judgment on deterioration of the $NO_x$-absorbing material based on the first amount of absorption TAo and the second amount of absorption TBo of $NO_x$ and oxygen and the first estimated value $NO_x1$ and the second estimated value $NO_x2$ of the amount of absorbed $NO_x$. It is therefore possible to perform the deterioration judgment operation taking into account the amount of $NO_x$ absorbed in the $NO_x$-absorbing material during the first reference time t1.

Therefore, it is possible to prevent such an undesirable situation that the $NO_x$-absorbing material is wrongly judged to be normally working despite the fact that it is already deteriorated due to the effects of the amount of $NO_x$ absorbed in the $NO_x$-absorbing material during the first reference time t1, and to make a judgment on deterioration of the $NO_x$-absorbing material with a high degree of accuracy based on the sensing signal fed from the second oxygen concentration detector 14 and the estimated values given by the $NO_x$ quantity estimator 23, even when a specific quantity of the $NO_x$-absorbing material and a large quantity of the oxygen-absorbing material are provided in the exhaust passage 3.

One of noticeable advantages of the exhaust-gas cleaning device of the present embodiment is that it can make a judgment on whether or not a specified quantity of $NO_x$ is absorbed in the $NO_x$-absorbing material in performing the deterioration judgment operation in a proper and easy way by comparing the aforementioned ratio To/ $NO_x$ with the predefined reference value D. This is because the exhaust-gas cleaning device is constructed to perform the operation for judging on the deterioration of the $NO_x$-absorbing material by the deterioration detector 24 based on the difference To between the second amount of absorption TBo and the first amount of absorption TAo of $NO_x$ and oxygen determined by the absorption quantity detector 22 and the difference $NO_x$ between the second estimated value $NO_x2$ and the first estimated value $NO_x1$ of the amount of $NO_x$ obtained by the $NO_x$ quantity estimator 23.

As an alternative to the foregoing embodiment, in which the deterioration judgment to determine whether the specified quantity of $NO_x$ has been absorbed in the $NO_x$-absorbing material is made by comparing the ratio To/ $NO_x$ with the predefined reference value D, the exhaust-gas cleaning device may be so constructed as to perform the deterioration judgment operation by calculating the difference between the aforementioned two differences $NO_x$. To and comparing it with a predefined reference value. In this alternative construction, it is necessary to make the deterioration judgment after converting the time periods TAo, TBo required for the oxygen concentration detected by the second oxygen concentration detector 14 to decrease to the specific low concentration level into the amounts of $NO_x$ and oxygen absorbed by the $NO_x$-absorbing material and the oxygen-absorbing material during the two periods TAo, TBo and calculating the difference between the converted amounts.

Another advantage the foregoing embodiment is that it is possible to obtain the first and second estimated values $NO_x1$, $NO_x2$ of the amount of $NO_x$ absorbed by the $NO_x$-absorbing material taking into account changes in the amount of $NO_x$ in the exhaust gas due to variations in the engine operating condition on the occurrence of such changes. This is because the exhaust-gas cleaning device is constructed such that the $NO_x$ quantity estimator 23 obtains the first and second estimated values $NO_x1$, $NO_x2$ of the amount of $NO_x$ absorbed by the $NO_x$-absorbing material in accordance with the engine speed and load.

As another alternative to the foregoing embodiment, the exhaust-gas cleaning device may be constructed such that the $NO_x$ quantity estimator 23 obtains the first and second estimated values $NO_x1$, $NO_x2$ of the amount of $NO_x$ absorbed by the $NO_x$-absorbing material in accordance with the temperature of engine cooling water and the amount of exhaust gas recirculated into the intake air by an exhaust recirculating system instead of or in addition to the engine speed and load.

Still another advantage the foregoing embodiment is that it is possible to determine the amounts of $NO_x$ and oxygen absorbed by the $NO_x$-absorbing material and the oxygen-absorbing material during the first and second reference times t1, t2 in a proper and easy way. This is because the exhaust-gas cleaning device is constructed such that the absorption quantity detector 22 determines the amounts of $NO_x$ and oxygen absorbed by the $NO_x$-absorbing material and the oxygen-absorbing material based on the time periods TAo and TBo required for the oxygen concentration detected by the second oxygen concentration detector 14 to decrease to the specific low concentration level from the aforementioned points T2 and T4, respectively, at which the oxygen concentration controller 21 completes the setting for transferring the exhaust gas upstream of the $NO_x$-absorbing material and the oxygen-absorbing material from the high oxygen concentration state to the low oxygen concentration state.

When the amount of $NO_x$ and oxygen absorbed in the $NO_x$-absorbing material of the lean $NO_x$ catalytic converter 13 and the oxygen-absorbing material of the three-way catalytic converter 12 is large, the amount of $NO_x$ and oxygen released from these materials after the first reference time t1 (second reference time t2) has elapsed increases, and the time period TAo (TBo) required for the oxygen concentration detected by the second oxygen concentration detector 14 to decrease to the specific low concentration level from the aforementioned point T2 (T4), at which the setting for transferring the exhaust gas upstream of the $NO_x$-absorbing material and the oxygen-absorbing material from the high oxygen concentration state to the low oxygen concentration state is completed, tends to increase due to the influence of oxygen released from the materials and produced by reduction of $NO_x$ It is therefore possible to obtain the first and second amounts of absorption of $NO_x$ and oxygen from the time periods TAo and TBo, respectively, in a proper and easy way.

As still another alternative to the foregoing embodiment, the exhaust-gas cleaning device may be so constructed as to determine the first and second amounts of absorption of $NO_x$ and oxygen absorbed by the $NO_x$-absorbing material and the oxygen-absorbing material based on oxygen concentration values detected by the second oxygen concentration detector 14 at the points T2 and T4, at which the oxygen concentration controller 21 completes the setting for transferring the exhaust gas upstream of the $NO_x$-absorbing material and the oxygen-absorbing material from the high oxygen concentration state to the low oxygen concentration state.

Yet another advantage the foregoing embodiment is that it is possible to determine the amount of absorption of $NO_x$ and oxygen by the absorption quantity detector 22 with high accuracy by performing the oxygen concentration control operation properly and quickly. This is because the exhaust-gas cleaning device is constructed such that it performs the control operation for transferring the exhaust gas discharged from the engine into the exhaust passage 3 to the low oxygen concentration state after creating the high concentration state for the first reference time t1 by controlling the air-fuel ratio in the combustion chamber with the oxygen concentration controller 21.

When the three-way catalytic converter 12 including the oxygen-absorbing material is provided upstream of $NO_x$-absorbing material provided in the lean $NO_x$ catalytic converter 13 as shown in the foregoing embodiment, oxygen released from the oxygen-absorbing material of the three-way catalytic converter 12 located on the upstream side, oxygen released from the $NO_x$-absorbing material of the lean $NO_x$ catalytic converter 13 located on the downstream side, and oxygen produced by reduction of $NO_x$ released from the $NO_x$-absorbing material individually affect the oxygen concentration value detected by the second oxygen concentration detector 14 during execution of the control operation for transferring the exhaust gas in the exhaust passage 3 from an oxygen-rich state (lean exhaust gas) to an oxygen-poor state (rich exhaust gas). It is therefore difficult to make a judgment on deterioration of the $NO_x$-absorbing material with high accuracy based on the oxygen concentration value detected by the second oxygen concentration detector 14.

Figure 6:
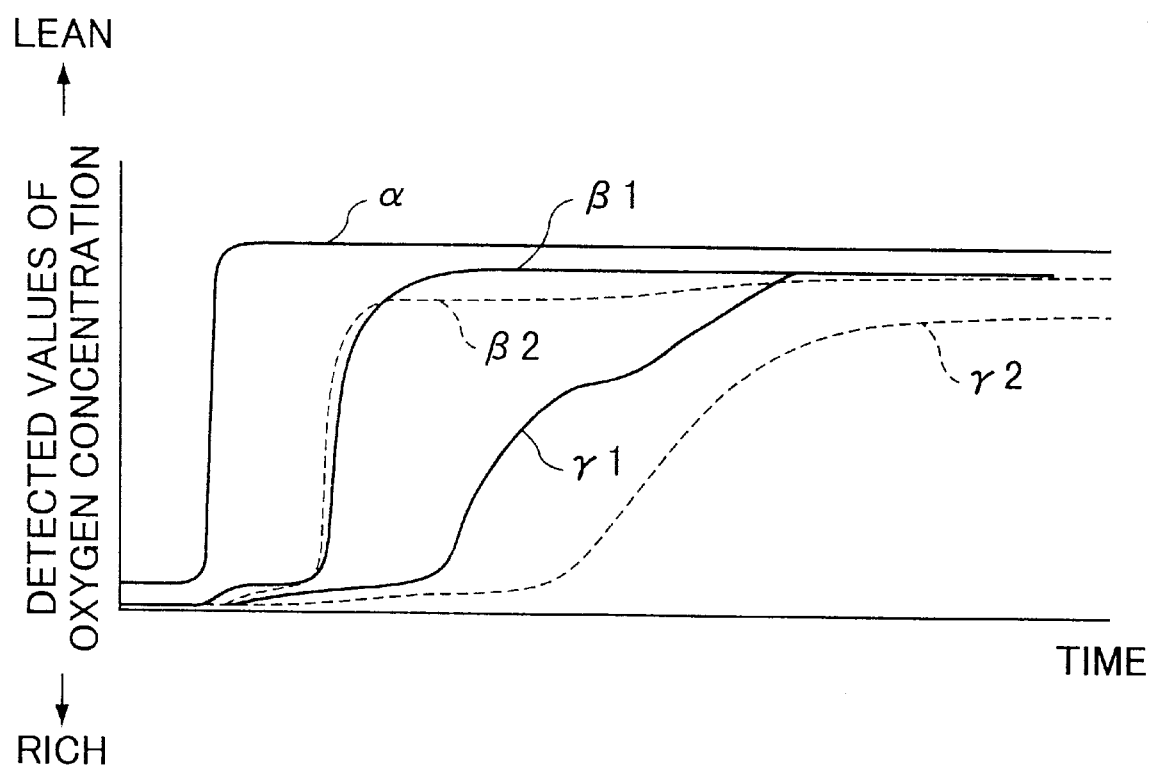
FIG. 6 is a graph showing how detected values of oxygen concentration vary with time.

Specifically, when the control operation for transferring the exhaust gas in the exhaust passage 3 from the oxygen-rich state (lean exhaust gas) to the oxygen-poor state (rich exhaust gas) is being executed, a comparison of values a detected by the first oxygen concentration detector 11 disposed upstream of the lean $NO_x$ catalytic converter 13 and the three-way catalytic converter 12, values γ detected by the second oxygen concentration detector 14 disposed downstream of the lean $NO_x$ catalytic converter 13 and the three-way catalytic converter 12, and values β detected by a third oxygen concentration detector disposed between the lean $NO_x$ catalytic converter 13 and the three-way catalytic converter 12 gives data depicted in FIG. 6.

It is recognized from FIG. 6 that although oxygen concentrations β1, β2 detected by the third oxygen concentration detector disposed between the catalytic converters 12 and 13 deviate from the oxygen concentration a detected by the first oxygen concentration detector 11 by an amount corresponding to the quantity of oxygen released from the oxygen-absorbing material of the three-way catalytic converter 12, there is not a much difference between the value β1 detected when the duration of the oxygen-rich state is set to 30 seconds and the value β2 detected when the duration of the oxygen-rich state is set to 180 seconds. This is because the oxygen concentrations β1, β2 are not affected by $NO_x$ and oxygen released from the $NO_x$-absorbing material and the oxygen-absorbing material of the lean $NO_x$ catalytic converter 13.

Compared to this, it is noticed that there is a substantial difference between the value γ1 detected when the duration of the oxygen-rich state is set to 30 seconds and the value γ2 detected when the duration of the oxygen-rich state is set to 180 seconds and, therefore, the influence of $NO_x$ released from the $NO_x$-absorbing material of the lean $NO_x$ catalytic converter 13 can not be disregarded. This is because the second oxygen concentration detector 14 is affected by oxygen produced when $NO_x$ released from the $NO_x$-absorbing material is reduced. For this reason, it is particularly desirable that the exhaust-gas cleaning device can make a correct judgment on deterioration of the $NO_x$-absorbing material based on the oxygen concentration value detected by the second oxygen concentration detector 14 by constructing the exhaust-gas cleaning device such that it performs the deterioration judgment operation taking into account the amount of $NO_x$ absorbed in the $NO_x$-absorbing material during the first reference time t1 as described earlier.

As previously mentioned, the exhaust-gas cleaning device of the foregoing embodiment is constructed such that the air-fuel mixture becomes significantly leaner during the first reference time t1 than during the second reference time t2 by causing the oxygen concentration controller 21 to make the amount of fuel injected during the first reference time t1 smaller than that injected during the second reference time t2 when making a judgment on deterioration of the $NO_x$-absorbing material. Therefore, the $NO_x$ quantity estimator 23 can correctly estimate the amount of $NO_x$ absorbed by the $NO_x$-absorbing material by making the amounts of $NO_x2$ reduced per unit time in the two reference times t1, t2 equal to a fixed value.

Specifically, it is possible to prevent degradation of the activity of the three-way catalytic converter 12 and the lean $NO_x$ catalytic converter 13 due to a drop in exhaust gas temperature during the second reference time t2 by executing a control operation for making the amount of fuel injected during the first reference time t2 which is longer than the second reference time t1 smaller than that injected during the second reference time t1. Therefore, the exhaust-gas cleaning device of the embodiment is advantageous in that estimation of the amount of $NO_x$ by the $NO_x$ quantity estimator 23 can be properly made by maintaining the amount of oxygen produced per unit time as a result of reduction of $NO_x$ at a fixed value when executing the deterioration judgment control operation.

Figure 7:
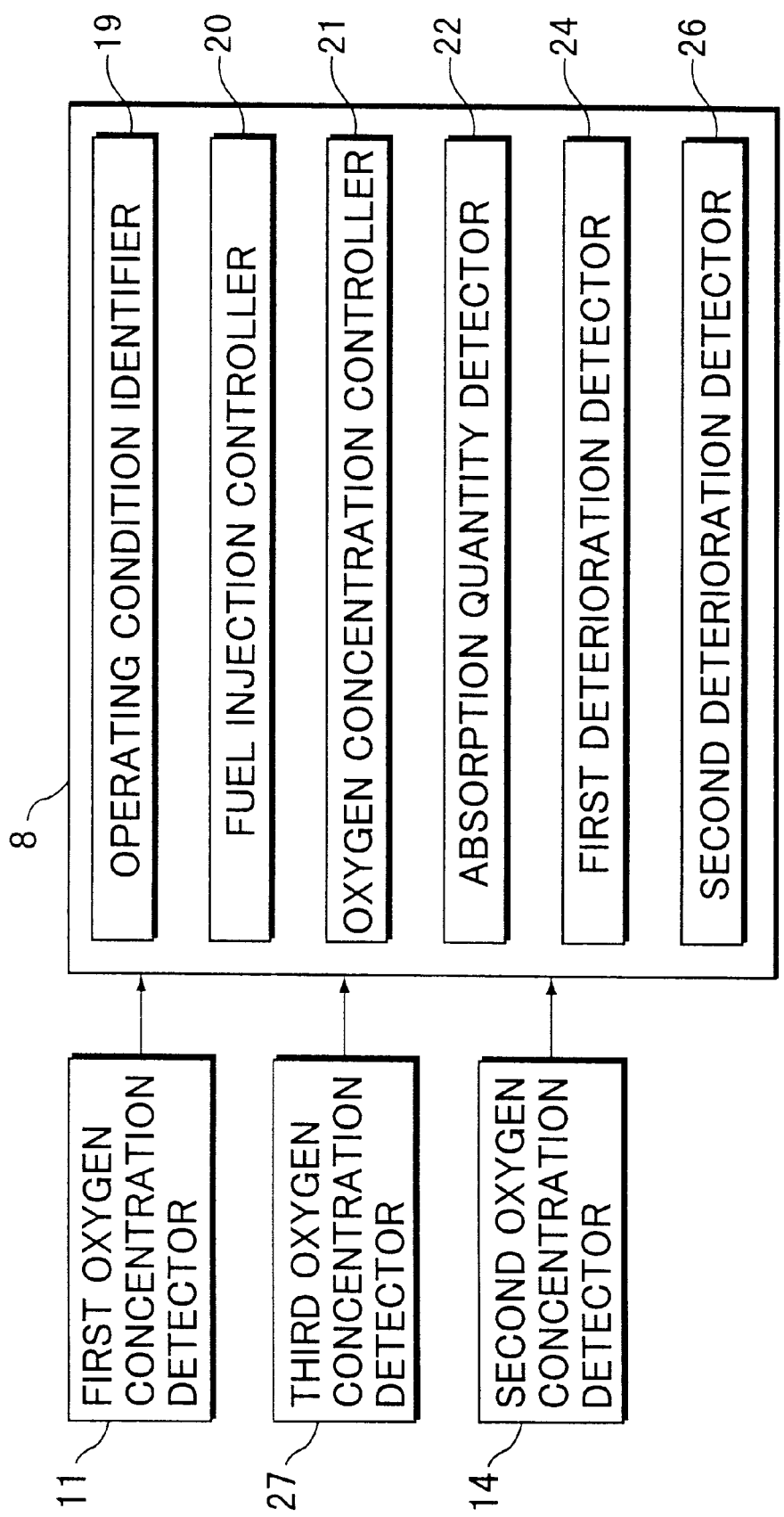
FIG. 7 is a block diagram showing an exhaust-gas cleaning device according to another embodiment of the invention.

While the foregoing discussion has dealt with the preferred embodiment in which the deterioration detector 24 makes a judgment on deterioration of the $NO_x$-absorbing material only, there may be provided a first deterioration detector 24 for making a judgment on deterioration of the $NO_x$-absorbing material provided in the lean $NO_x$ catalytic converter 13 based on the first and second amounts of absorption detected by the absorption quantity detector 22 and a second deterioration detector 26 for making a judgment on deterioration of the oxygen-absorbing material provided in the three-way catalytic converter 12 as shown in FIG. 7.

In this second embodiment, the second deterioration detector 26 is so constructed as to perform a feedback operation to switch the air-fuel mixture in the combustion chamber between rich and lean states based on oxygen concentration values detected by the first and third oxygen concentration detectors, or to simply switch the mixture in the combustion chamber between the rich and lean states at fixed time intervals without using the oxygen concentration values detected by the first and third oxygen concentration detectors, for a specified time period which is set to approximately 2 minutes such that the air-fuel ratio in the combustion chamber eventually equals the stoichiometric air-fuel ratio, and judge whether or not the oxygen-absorbing material has deteriorated by comparing a sensing signal fed from the first oxygen concentration detector 11 provided upstream of the three-way catalytic converter 12 and the lean $NO_x$ catalytic converter 13 during the specified time period and a sensing signal fed from the third oxygen concentration detector 27 formed mainly of a $\lambda O_2$ sensor disposed between the three-way catalytic converter 12 and the lean $NO_x$ catalytic converter 13 during the specified time period.

More specifically, the second deterioration detector 26 compares the number of times the oxygen concentration value detected by the first oxygen concentration detector 11 is switched (from the lean state to the rich state) during the specified time period and the number of times the oxygen concentration value detected by the third oxygen concentration detector 27 is switched during the specified time period, and judges that the oxygen-absorbing material has deteriorated if the ratio of the number of times the oxygen concentration value detected by the third oxygen concentration detector 27 is switched to the number of times the oxygen concentration value detected by the first oxygen concentration detector 11 is switched is found to be larger than a preset value. This judgment is based on the fact that the number of times the oxygen concentration value detected by the third oxygen concentration detector 27 is switched should be sufficiently smaller than the number of times the oxygen concentration value detected by the first oxygen concentration detector 11 is switched if the oxygen-absorbing material is normal.

When the oxygen-absorbing material has been judged to have deteriorated by the second deterioration detector 26, the judgment on deterioration of the $NO_x$-absorbing material by the first deterioration detector 24 is inhibited or a control operation is performed to change a reference value used in the deterioration judgment operation, for example. This makes it possible to make a judgment on deterioration of the $NO_x$-absorbing material with high accuracy, preventing misjudgment potentially caused by an increase in the amounts of HC and CO supplied to the $NO_x$-absorbing material as a result of deterioration of the oxygen-absorbing material, as well as by an increase in the rate of releasing $NO_x$ from the $NO_x$-absorbing material which occurs as HC and CO serve as reducing agents.

While the oxygen concentration is controlled by adjusting the amount of injected fuel in the foregoing embodiments, the oxygen concentration may be controlled by adjusting the amount or timing of secondary injection if the engine is of a type constructed to make the secondary fuel injection during an expansion stroke, or by adjusting the amount of secondary air if the engine is of a type provided with an arrangement for supplying secondary air to the exhaust passage 3, for example.

This application is based on Japanese Application Serial No. 2000-13897 filed in Japanese Patent Office on Jan. 18, 2000, the contents of which are hereby incorporated by reference.

Although the present invention has been fully described by way of example with reference to the accompanying drawings, it is to be understood that various changes and modifications will be apparent to those skilled in the art. Therefore unless otherwise such changes and modifications depart from the scope of the present invention hereinafter defined, they should be construed as being included therein.

What is claimed is:

1. An exhaust-gas cleaning device for an engine, said exhaust-gas cleaning device comprising:
a $NO_x$-absorbing material provided in an exhaust passage to absorb $NO_x$ under oxygen-rich conditions where the oxygen concentration is high and release absorbed $NO_x$ as the oxygen concentration decreases;
an oxygen-absorbing material provided in the exhaust passage to absorb oxygen under oxygen-rich conditions where the oxygen concentration is high and release absorbed oxygen as the oxygen concentration decreases;
an oxygen concentration controlling means for controlling the oxygen concentration in the exhaust passage;
an oxygen concentration detecting means provided downstream of the $NO_x$-absorbing material and the oxygen-absorbing material;
an absorption quantity detecting means which determines a first amount of absorption of $NO_x$ and oxygen absorbed by the $NO_x$-absorbing material and the oxygen-absorbing material based on a sensing signal fed from the oxygen concentration detecting means at a time when the oxygen concentration upstream of the $NO_x$-absorbing material and the oxygen-absorbing material is just transferred from a high concentration state maintained for a preset first reference time to a low concentration state by controlling the oxygen concentration with the oxygen concentration controlling means, and determines a second amount of absorption of $NO_x$ and oxygen absorbed by the $NO_x$-absorbing material and the oxygen-absorbing material based on a sensing signal fed from the oxygen concentration detecting means at a time when the oxygen concentration upstream of the $NO_x$-absorbing material and the oxygen-absorbing material is just transferred from the high concentration state maintained for a preset second reference time which is longer than the first reference time to the low concentration state by controlling the oxygen concentration with the oxygen concentration controlling means;
a $NO_x$ quantity estimating means which obtains a first estimated value of the amount of $NO_x$ absorbed by the $NO_x$-absorbing material during the first reference time and a second estimated value of the amount of $NO_x$ absorbed by the $NO_x$-absorbing material during the second reference time in accordance with engine operating condition; and
a deterioration detecting means which makes a judgment on deterioration of the $NO_x$-absorbing material based on the first amount of absorption and the second amount of absorption of $NO_x$ and oxygen determined by the absorption quantity detecting means and the first estimated value and the second estimated value of the amount of absorbed $NO_x$ obtained by the $NO_x$ quantity estimating means.

2. An exhaust-gas cleaning device for an engine according to claim 1, wherein the deterioration detecting means makes a judgment on deterioration of the $NO_x$-absorbing material based on the difference between the second amount of absorption and the first amount of absorption of $NO_x$ and oxygen determined by the absorption quantity detecting means and the difference between the second estimated value and the first estimated value of the amount of $NO_x$ obtained by the $NO_x$ quantity estimating means.

3. An exhaust-gas cleaning device for an engine according to claim 1, wherein the $NO_x$ quantity estimating means obtains the first estimated value and the second estimated value of the amount of $NO_x$ absorbed by the $NO_x$-absorbing material in accordance with engine speed and engine load.

4. An exhaust-gas cleaning device for an engine according to claim 1, wherein the absorption quantity detecting means is so constructed as to determine the amount of $NO_x$ and oxygen absorbed by the $NO_x$-absorbing material and the oxygen-absorbing material based on the time period required for the oxygen concentration detected by the oxygen concentration detecting means to decrease to a specific low concentration level from a point in time when the oxygen concentration controlling means executes a control operation for transferring the oxygen concentration upstream of the $NO_x$-absorbing material and the oxygen-absorbing material from the high concentration state to the low concentration state.

5. An exhaust-gas cleaning device for an engine according to claim 1, wherein the oxygen concentration controlling means is so constructed as to control the oxygen concentration in the exhaust passage by controlling the air-fuel ratio in a combustion chamber.

6. An exhaust-gas cleaning device for an engine according to claim 1, wherein the oxygen-absorbing material is provided upstream of the $NO_x$-absorbing material.

7. An exhaust-gas cleaning device for an engine, said exhaust-gas cleaning device comprising:

a $NO_x$-absorbing material provided in an exhaust passage to absorb $NO_x$ under oxygen-rich conditions where the oxygen concentration is high and release absorbed $NO_x$ as the oxygen concentration decreases;

an oxygen-absorbing material provided in the exhaust passage to absorb oxygen under oxygen-rich conditions where the oxygen concentration is high and release absorbed oxygen as the oxygen concentration decreases;

an oxygen concentration controlling means for controlling the oxygen concentration in exhaust gas;

an oxygen concentration detecting means provided downstream of the $NO_x$-absorbing material and the oxygen-absorbing material;

an absorption quantity detecting means which determines a first amount of absorption of $NO_x$ and oxygen absorbed by the $NO_x$-absorbing material and the oxygen-absorbing material based on a sensing signal fed from the oxygen concentration detecting means at a time when the oxygen concentration upstream of the $NO_x$-absorbing material and the oxygen-absorbing material is just transferred from a high concentration state maintained for a preset first reference time to a low concentration state by controlling the oxygen concentration with the oxygen concentration controlling means, and determines a second amount of absorption of $NO_x$ and oxygen absorbed by the $NO_x$-absorbing material and the oxygen-absorbing material based on a sensing signal fed from the oxygen concentration detecting means at a time when the oxygen concentration upstream of the $NO_x$-absorbing material and the oxygen-absorbing material is Just transferred from the high concentration state maintained for a preset second reference time which is longer than the first reference time to the low concentration state by controlling the oxygen concentration with the oxygen concentration controlling means;

a first deterioration detecting means which makes a judgment on deterioration of the $NO_x$-absorbing material based on the first amount of absorption and the second amount of absorption of $NO_x$ and oxygen determined by the absorption quantity detecting means; and a second deterioration detecting means which makes a judgment on deterioration of the oxygen-absorbing material;

wherein the judgment on deterioration of the $NO_x$-absorbing material by the first deterioration detecting means is inhibited when the oxygen-absorbing material has been judged to have deteriorated by the second deterioration detecting means.

8. An exhaust-gas cleaning device for an engine according to claim 7, wherein the absorption quantity detecting means is so constructed as to determine the amount of $NO_x$ and oxygen absorbed by the $NO_x$-absorbing material and the oxygen-absorbing material based on the time period required for the oxygen concentration detected by the oxygen concentration detecting means to decrease to a specific low concentration level from a point in time when the oxygen concentration controlling means executes a control operation for transferring the oxygen concentration upstream of the $NO_x$-absorbing material and the oxygen-absorbing material from the high concentration state to the low concentration state.

9. An exhaust-gas cleaning device for an engine according to claim 7, wherein the oxygen concentration controlling means is so constructed as to control the oxygen concentration in the exhaust passage by controlling the air-fuel ratio in a combustion chamber.

10. An exhaust-gas cleaning device for an engine according to claim 7, wherein the oxygen-absorbing material is provided upstream of the $NO_x$-absorbing material.

11. An exhaust-gas cleaning device for an engine, said exhaust-gas cleaning device comprising:

a $NO_x$-absorbing material provided in an exhaust passage to absorb $NO_x$ under oxygen-rich conditions where the oxygen concentration is high and release absorbed $NO_x$ as the oxygen concentration decreases;

an oxygen-absorbing material provided in the exhaust passage to absorb oxygen under oxygen-rich conditions where the oxygen concentration is high and release absorbed oxygen as the oxygen concentration decreases;

an oxygen concentration controller for controlling the oxygen concentration in the exhaust passage;

an oxygen concentration detector provided downstream of the $NO_x$-absorbing material and the oxygen-absorbing material;

an absorption quantity detector which determines a first amount of absorption of $NO_x$ and oxygen absorbed by the $NO_x$-absorbing material and the oxygen-absorbing material based on a sensing signal fed from the oxygen concentration detector at a time when the oxygen concentration upstream of the $NO_x$-absorbing material and the oxygen-absorbing material is just transferred from a high concentration state maintained for a preset first reference time to a low concentration state by controlling the oxygen concentration with the oxygen concentration controller, and determines a second amount of absorption of $NO_x$ and oxygen absorbed by the $NO_x$-absorbing material and the oxygen-absorbing material based on a sensing signal fed from the oxygen concentration detector at a time when the oxygen concentration upstream of the $NO_x$-absorbing material and the oxygen-absorbing material is just transferred from the high concentration state maintained for a preset second reference time which is longer than the first reference time to the low concentration state by controlling the oxygen concentration with the oxygen concentration controller;

a $NO_x$ quantity estimator which obtains a first estimated value of the amount of $NO_x$ absorbed by the $NO_x$-absorbing material during the first reference time and a second estimated value of the amount of $NO_x$ absorbed by the $NO_x$-absorbing material during the second reference time in accordance with engine operating condition; and a deterioration detector which makes a judgment on deterioration of the $NO_x$-absorbing material based on the first amount of absorption and the second amount of absorption of $NO_x$ and oxygen determined by the absorption quantity detector and the first estimated value and the second estimated value of the amount of absorbed $NO_x$ obtained by the $NO_x$ quantity estimator.

12. An exhaust-gas cleaning device for an engine, said exhaust-gas cleaning device comprising:

a $NO_x$-absorbing material provided in an exhaust passage to absorb $NO_x$ under oxygen-rich conditions where the oxygen concentration is high and release absorbed $NO_x$ as the oxygen concentration decreases;

an oxygen-absorbing material provided in the exhaust passage to absorb oxygen under oxygen-rich conditions where the oxygen concentration is high and release absorbed oxygen as the oxygen concentration decreases;

an oxygen concentration controller for controlling the oxygen concentration in exhaust gas;

an oxygen concentration detector provided downstream of the $NO_x$-absorbing material and the oxygen-absorbing material;

an absorption quantity detector which determines a first amount of absorption of $NO_x$ and oxygen absorbed by the $NO_x$-absorbing material and the oxygen-absorbing material based on a sensing signal fed from the oxygen concentration detector at a time when the oxygen concentration upstream of the $NO_x$-absorbing material and the oxygen-absorbing material is just transferred from a high concentration state maintained for a preset first reference time to a low concentration state by controlling the oxygen concentration with the oxygen concentration controller, and determines a second amount of absorption of $NO_x$ and oxygen absorbed by the $NO_x$-absorbing material and the oxygen-absorbing material based on a sensing signal fed from the oxygen concentration detector at a time when the oxygen concentration upstream of the $NO_x$-absorbing material and the oxygen-absorbing material is just transferred from the high concentration state maintained for a preset second reference time which is longer than the first reference time to the low concentration state by controlling the oxygen concentration with the oxygen concentration controller;

a first deterioration detector which makes a judgment on deterioration of the $NO_x$-absorbing material based on the first amount of absorption and the second amount of absorption of $NO_x$ and oxygen determined by the absorption quantity detector; and a second deterioration detector which makes a judgment on deterioration of the oxygen-absorbing material;

wherein the judgment on deterioration of the $NO_x$-absorbing material by the first deterioration detector is inhibited when the oxygen-absorbing material has been judged to have deteriorated by the second deterioration detector.

\* \* \* \* \*